United States Patent
Karlsson et al.

[11] Patent Number: 6,119,764
[45] Date of Patent: *Sep. 19, 2000

[54] DEVICE OF A ROTARY REGENERATIVE HEAT EXCHANGER

[75] Inventors: Kurt Karlsson, Tyresö; Stig Lundin, Värmdö, both of Sweden

[73] Assignee: ABB Air Preheater, Inc., Wellsville, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/230,141
[22] PCT Filed: Aug. 14, 1997
[86] PCT No.: PCT/SE97/01349
  § 371 Date: Apr. 27, 1999
  § 102(e) Date: Apr. 27, 1999
[87] PCT Pub. No.: WO98/06993
  PCT Pub. Date: Feb. 19, 1998

[30] Foreign Application Priority Data

Aug. 15, 1996 [SE] Sweden ................................. 9602992

[51] Int. Cl.⁷ ............................................... F23L 15/02
[52] U.S. Cl. ................................ 165/8; 165/11.1
[58] Field of Search ........................ 165/10, 11.1, 9, 165/8, 6, 4

[56] References Cited

U.S. PATENT DOCUMENTS

| | | | |
|---|---|---|---|
| 3,232,335 | 2/1966 | Kalbfleisch | 165/9 |
| 3,250,316 | 5/1966 | Nyberg | 165/9 |
| 3,968,569 | 7/1976 | Faris . | |
| 4,000,774 | 1/1977 | Puritz et al. . | |
| 4,219,069 | 8/1980 | Stockman | 165/9 |
| 4,301,858 | 11/1981 | Mock . | |
| 4,610,297 | 9/1986 | Gibson et al. . | |

FOREIGN PATENT DOCUMENTS

| | | | |
|---|---|---|---|
| 0225583 | 10/1986 | Japan | 165/9 |
| 2281393 | 3/1995 | United Kingdom . | |

*Primary Examiner*—Christopher Atkinson
*Attorney, Agent, or Firm*—Frishauf, Holtz, Goodman, Langer & Chick, P.C.

[57] ABSTRACT

A regenerative, rotary heat exchanger includes a stationary housing; a rotatable rotor in the housing; radially extending partition walls in the rotor separating the rotor into sectors; and a regeneratable mass in the sectors. Axially adjustable sector plates are located in sealing relation with respect to respective axial end surfaces of the rotor into which and out from which two heat exchanging media are directed in counter-flow separated by the partition walls. A flange is fixedly attached to the rotor and extends circumferentially around at least one of the respective axial end surfaces of the rotor, and a sensing device senses a clearance between at least one of the sector plates and the flange. A controller adjusts the clearance to a predetermined size responsive to the sensing device. At least one of the sector plates is provided with at least one projection which projects peripherally beyond a side edge of the sector plate at a position opposite the flange; and the sensing device is mounted on the at least one projection

3 Claims, 1 Drawing Sheet

DEVICE OF A ROTARY REGENERATIVE HEAT EXCHANGER

BACKGROUND OF THE INVENTION

The present invention pertains to an arrangement in regenerative rotary heat exchangers, particularly air preheaters, for detecting and controlling clearance between a flange that projects radially outwards around the end surfaces of the rotor and axially in relation to movable sector plates of the rotor that mutually separate the two heat exchanging media.

Arrangements of this kind have been the subject of comprehensive development over a long period of time. The problem to be solved is that clearance detecting or sensing devices in particular are often exposed to troublesome ambient conditions, namely a corrosive and dirty atmosphere with considerable variations in pressure and temperature as the rotor rotates. This is because as the rotor sectors pass in towards and out from the edges of the sector plates the heat exchanging media will flow alternately around the sensors active between the sector plates and rotor flanges at alternately high and low pressures and exert a disturbing influence thereon. Despite efforts to compensate for disturbances, the effect of the ambient conditions renders sensing unreliable. As a result, developments have leaned towards more sophisticated solutions, such as slip shoes that include forward feed arrangements for compensating wear, and air cushion arrangements.

OBJECTS OF THE INVENTION

The object of the present invention is to provide a simple and reliable sensor or detector arrangement on which ambient conditions will have substantially no effect.

This object is achieved with an arrangement that has the characteristic features set forth in the accompanying independent claim. Preferred embodiments are defined in the accompanying dependent claims.

As a result of placing the detectors or sensors connected with the sector plates outside the regions of said plates, i.e. in the passageways for respective heat exchange media, the ambient conditions to which the sensors are subjected will be stable in normal operation. As will be apparent from the dependent claim, simple, operationally reliable sensors or detectors based on through-flushing with cooling and cleansing compressed air can be used without subjecting the sensors to worse disturbances than those that can be compensated for in an appropriate manner.

BRIEF DESCRIPTION OF THE DRAWINGS

So that the invention will be understood more readily and its features made more apparent, the invention will now be described in more detail with reference to an exemplifying embodiment of an inventive sensing arrangement and with reference to the accompanying schematic drawings, in which.

DETAILED DESCRIPTION

Figure 1:
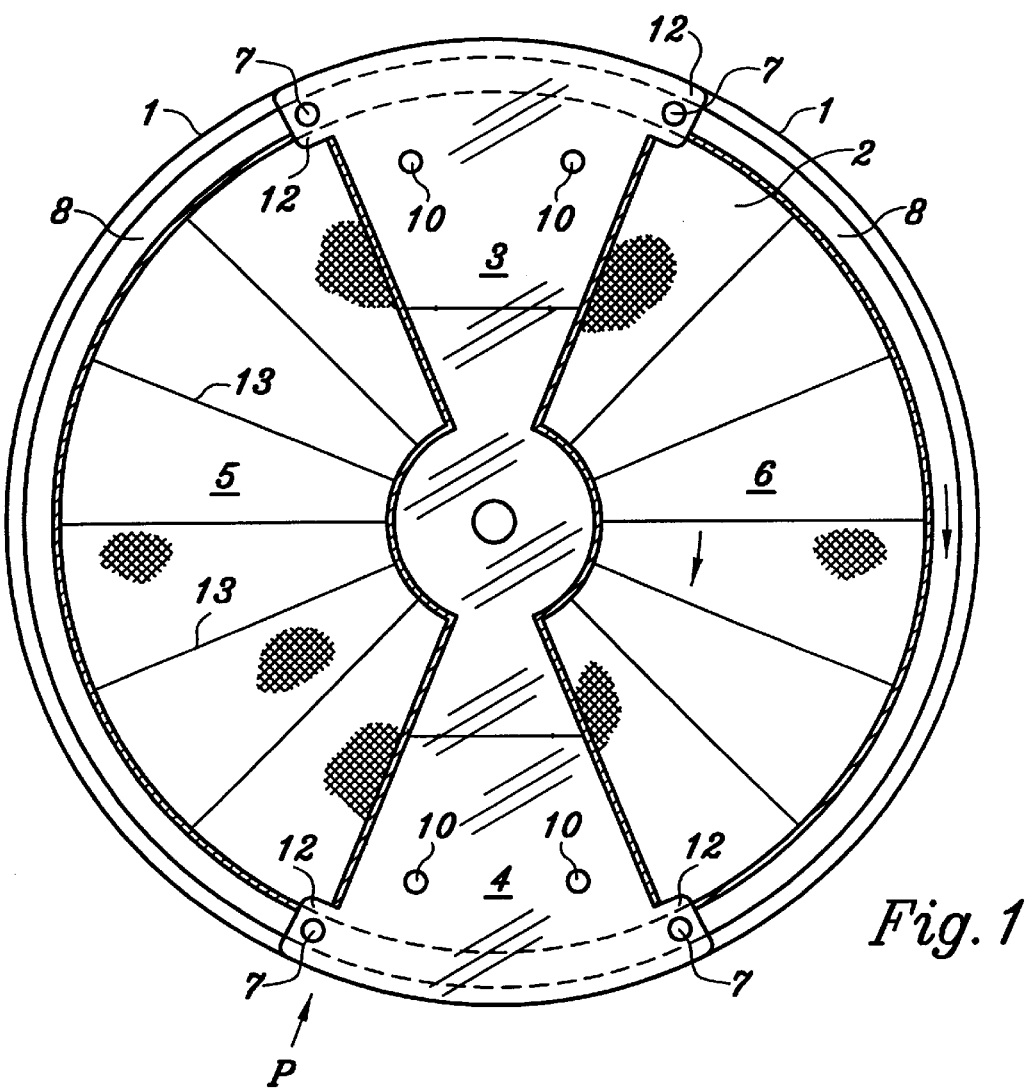
FIG. 1 illustrates an air preheater from above.

FIG. 1 illustrates a typical rotary, regenerative air preheater intended for preheating combustion air with the aid of exhaust gases. The preheater includes a stationary housing 1 in which there is mounted a rotatable rotor which has a regeneratable mass and which is rotated at a speed of about one (1) r.p.m. Two sector plates 3, 4 are mounted for axial movement relative to the rotor and disposed close to the end surface of the rotor, both above and beneath said rotor. The sector plates 3, 4 separate a gas side 5 from an air side 6, wherewith although gas and air are able to enter beneath the edges of respective sector plates due to rotation of the rotor, there need be no direct leakage from one side to the other provided that the clearance between the sector plates 3, 4 and the ends of the rotor can be kept low in spite of the fact that the rotor ends are never completely flat but are liable to deviate markedly from a flat state as a result of thermal deformation.

Figure 2:
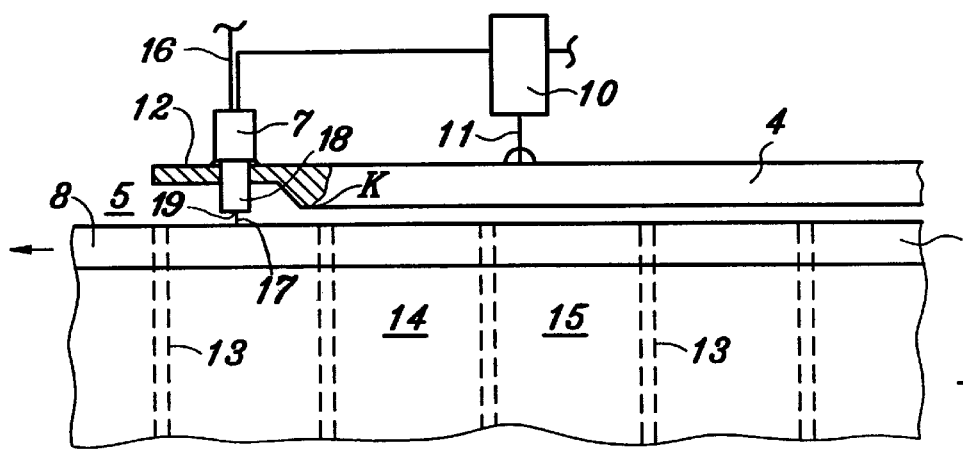
FIG. 2 illustrates sensing and controlling of clearance between a rotor flange and a sector plate, in side view.

The outer ends of the sector plates are each guided by two sensors 7. The sensors coact with a flange 8 that extends circumferentially around the rotor, at the top and bottom thereof respectively, as shown in FIG. 2 for the upper part of the air preheater, seen in the direction of arrow P in FIG. 1, and with controller 10 connected to said sensor and fixedly mounted in the housing 1 and hinged to the sector plate 3, 4 by means of a respective adjuster rod 11. The sensors 7 are mounted on peripheral projections 12 that extend out from a radially outermost point on each side edge of each sector plate 3, 4 and opposite the adjacently lying rotor flange 8.

The rotor 2 is divided into sectors by radially extending walls 13, the vertical edges of which are marked in FIG. 2. As the walls 13 pass the edge designated K of the sector plate 4 from right to left in the drawing, the gas side 5 will suddenly communicate with the sector 14, resulting in abrupt changes in pressure and temperature until the sector designated 15 takes the first mentioned position, i. e. precisely in that position in which clearance sensors are usually placed. Corresponding disturbances occur on the other side edge (not shown in Fig, 2) of the sector plate 4, where the air side 6 is located. By virtue of being mounted on projections 12, the sensors 7 will be located completely within the respective gas and air sides where stable pressure and temperature conditions prevail in normal operation. Disturbances can only occur at the beginning or the end of a working operation or in the event of marked changes in load, where monitoring of the system may be necessary unless separate compensatory measures are taken. This enables the use of compressed-air driven sensors that are especially suitable in this particular context, whereby compressed air delivered via a compressed air conduit 16 cools the sensors and, at the same time, blows clean that region of the heat exchanger in which the sensors are located. Clearance can be detected or sensed by means of a compressed-air jet 17 directed towards the flange 8, the magnitude of the clearance being reflected in the changes in pressure on the pressure side. Alternatively there can be used a compressed-air operated pipe 18 that is tuned to a specific resonance frequency. Any change in the distance between a pipe orifice 19 and the flange 8 will result in a corresponding change in the resonance frequency of the pipe.

What is claimed is:

1. A regenerative, rotary heat exchanger comprising:
   a stationary housing;
   a rotatable rotor in said housing;
   radially extending partition walls in said rotor separating said rotor into sectors;
   a regeneratable mass in said sectors;
   axially adjustable sector plates located in sealing relation with respect to respective axial end surfaces of said rotor into which and out from which two heat exchanging media are directed in counter-flow separated by said partition walls;

a flange fixedly attached to said rotor and extending circumferentially around at least one of said respective axial end surfaces of said rotor;

a sensing device for sensing a clearance between at least one of said sector plates and said flange;

a controller for adjusting said clearance to a predetermined size responsive to said sensing device;

wherein said at least one of said sector plates is provided with at least one projection which projects peripherally beyond a side edge of said sector plate at a position opposite said flange; and wherein said sensing device is mounted on said at least one projection.

2. The regenerative, rotary heat exchanger according to claim 1, wherein the sensing device comprises a compressed air conduit for directing a jet of compressed air onto the flange and a compressed-air jet for sensing variations in pressure in the delivered compressed air, and wherein the controller adjusts a setting of said at least one of said sector plates based on the sensed variations in pressure.

3. The regenerative, rotary heat exchanger according to claim 1, wherein the sensing device comprises a compressed-air driven pipe that is tuned to a specific resonance frequency and that has an orifice located adjacent to the flange so that changes in the clearance will be represented by changes in the resonance frequency of the pipe, and wherein the controller adjusts a setting of said at least one of said sector plates based on the changes in the resonance frequency of the pipe.

* * * * *